Dec. 9, 1930.  W. A. NEWMAN  1,784,247
WATER GAUGE GUARD
Filed Dec. 16, 1925  4 Sheets-Sheet 1

William A. Newman,
Inventor
Attorneys.

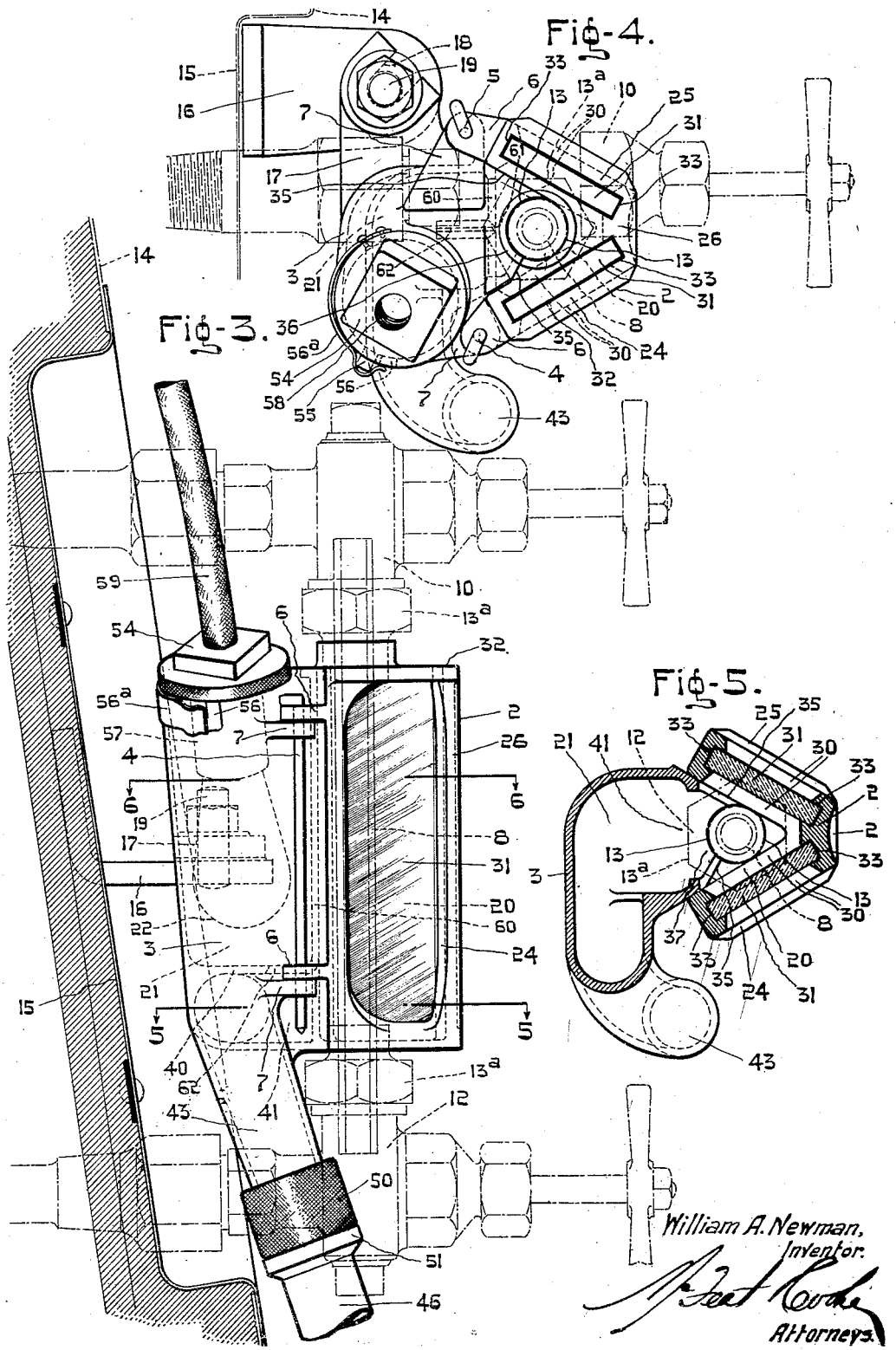

Dec. 9, 1930.  W. A. NEWMAN  1,784,247
WATER GAUGE GUARD
Filed Dec. 16, 1925   4 Sheets-Sheet 3
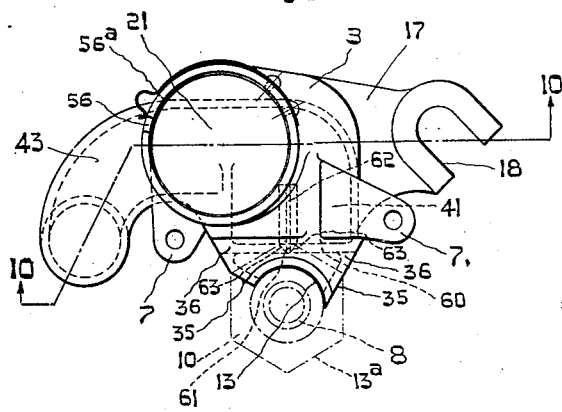
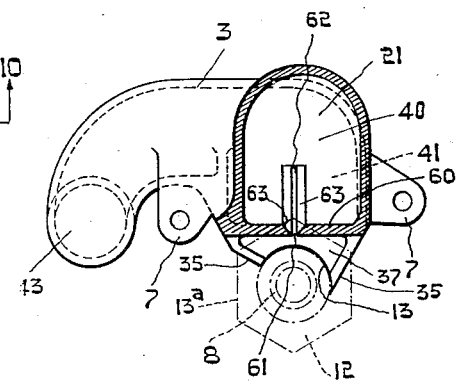
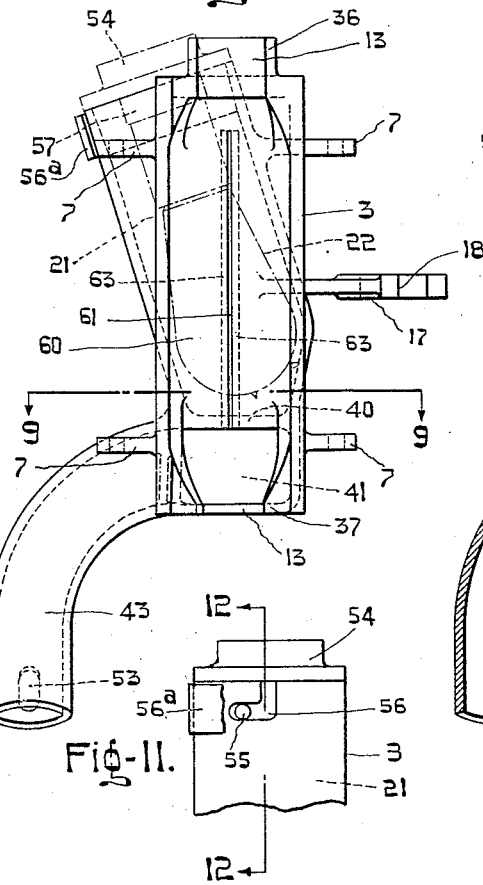
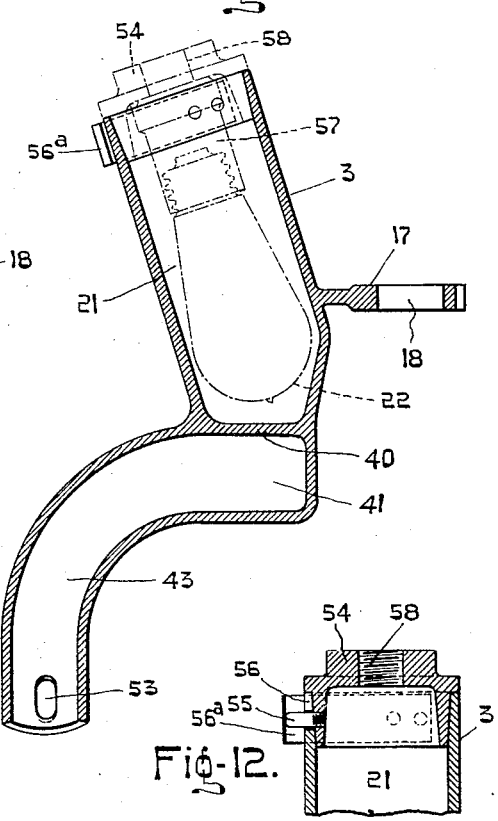
William A. Newman, Inventor.
Attorneys.

Dec. 9, 1930.  W. A. NEWMAN  1,784,247
WATER GAUGE GUARD
Filed Dec. 16, 1925  4 Sheets-Sheet 4
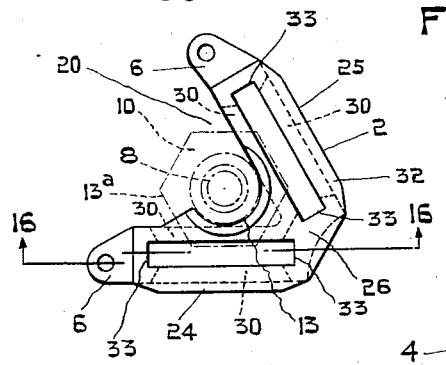
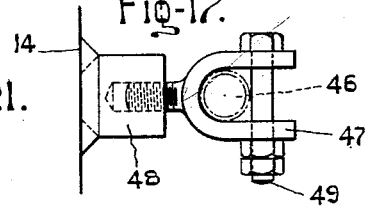
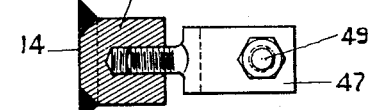
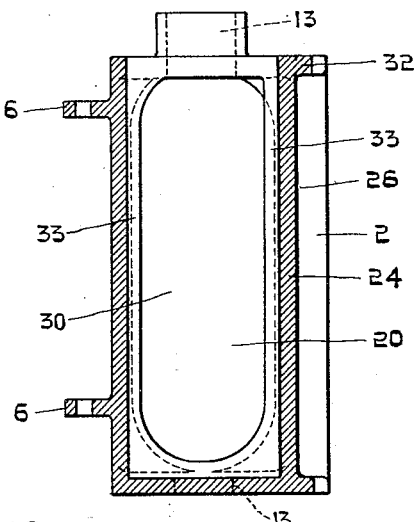
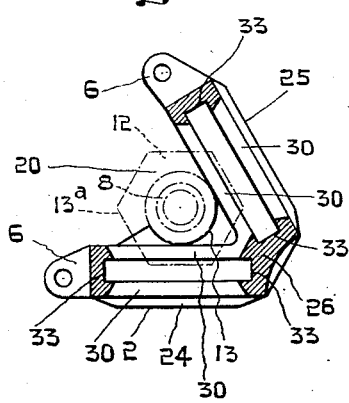
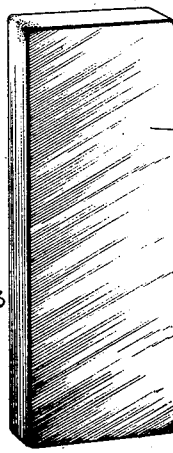
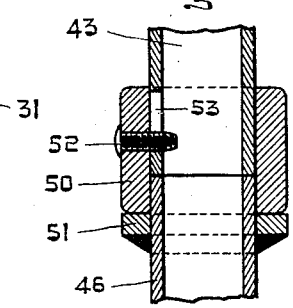
William A. Newman,
Inventor
Attorneys.

Patented Dec. 9, 1930

1,784,247

UNITED STATES PATENT OFFICE

WILLIAM A. NEWMAN, OF MONTREAL, QUEBEC, CANADA

WATER-GAUGE GUARD

Application filed December 16, 1925, Serial No. 75,843, and in Canada October 9, 1926.

My invention relates to guards for water gauges of steam boilers and particularly to guards for the water gauges on locomotive boilers, the purpose of the guard being to prevent injury to the train crew when the water gauge glass bursts by deflecting the broken glass and steam to a point where it cannot do any serious damage.

The object of the present invention is to provide a new and improved guard of this type which may be readily mounted in position housing the water gauge and as readily removed therefrom without disturbing the gauge in any way.

My improved guard consists of a two part metallic unit, the parts of which are adapted to be detachably connected together in positions embracing the water glass from opposite sides thereof, one part having transparent panels through which the train crew may observe the level in the water glass, and the other part having a lamp chamber and a lamp detachably mounted therein, the division wall between the lamp and the water glass chamber having an opening through which light is concentrated on the water glass.

The salient features of this invention are:

(a) The two-part guard the parts of which are detachably connected together in such a manner that the guard may be instantly applied to or removed from a water gauge without disturbing the latter in any way;

(b) The internal construction of the guard in which the light from the lamp chamber is concentrated on the back of the water glass;

(c) The detachable mount for the electric lamp;

(d) The relief pipe for conducting steam and broken glass from the lamp chamber to a point in close proximity of the firing deck of the locomotive cab.

For full comprehension however of my invention, reference must be had to the accompanying drawings in which similar reference characters indicate the same parts, and wherein:

Figure 3 is a side elevation of the guard shown in Figure 2;

Figure 4 is a plan view thereof;

Figure 5 is a horizontal sectional view taken on line 5—5 Figure 3;

Figure 7 is a plan view of the back part of the guard;

Figure 8 is a front elevation thereof;

Figure 9 is a horizontal sectional view taken on line 9—9 Figure 8;

Figure 10 is a vertical sectional view taken on line 10—10 Figure 7;

Figure 11 is a fragmentary detail view illustrating the means for closing the top of the lamp chamber;

Figure 12 is a sectional view taken on line 12—12 Figure 11;

Figure 13 is a plan view of the front part of the guard;

Figure 14 is a side elevation thereof;

Figure 15 is a horizontal sectional view taken on line 15—15 Figure 14;

Figure 16 is a vertical sectional view taken on line 16—16 Figure 13;

Figures 17 and 18 are detail views of the means for fastening the discharge end of the spout to the locomotive back head;

Figure 19 is a detail perspective view of one of the glass panels in the front part of the guard;

Figure 20 is a detail sectional view illustrating the method of fastening portions of the spout together; and Figure 21 is a detail view of one of the pins for securing the front and back part of the guards together.

Figure 1:
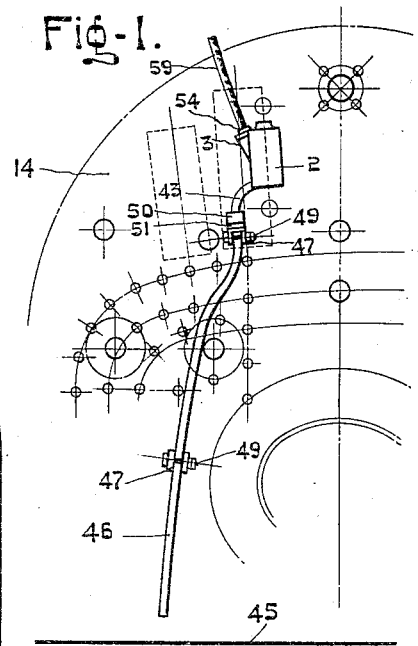
Figure 1 is an elevation of the back head of a locomotive boiler illustrating the water gauge equipped with my improved water gauge guard.

The accompanying drawings illustrate the preferred embodiment of my invention.

This embodiment consists of a metallic unit divided vertically into front and back parts 2 and 3 detachably connected together by pins 4 and 5 dropped through aligned openings in pairs of lugs 6 and 7, the lugs and pins being so arranged that either pin or both may be pulled out at a moment's notice. When one only is pulled out the other serves as a hinge pin enabling the front part of the guard to be swung open.

When detachably united the two parts completely house the entire length of the water glass 8 between the packing nuts on the valve fittings 10 and 12 the top and bottom ends of the guard parts having semi-circular openings 13 which combine in forming circular openings through which the water glass 8 extends as shown in dotted lines in Figure 3. The backhead of the boiler is indicated at 14 and has a recess 15 to provide ample clearance for the water glass and its guard. The gauge is entirely relieved of the weight of the guard by an angular bracket 16 which is welded to the backhead within the recess and detachably supports the guard through a laterally extending arm 17 on the back part, the free end of the arm being forked as at 18 to permit it to be easily and quickly released from the bolt 19 securing it to the bracket.

The interior of the guard is divided into a water glass chamber 20 and a lamp chamber 21, the water glass passing upwardly through the first mentioned chamber and being illuminated by an electric lamp 22 in the lamp chamber.

The front part 2 of the guard consists of a unitary metal frame of V-form in cross-section the sides of which are indicated at 24 and 25 and are united at their front edges as at 26. Each side has a comparatively large opening 30 which is closed by a glass panel 31 the edges of which are firmly secured in grooves 33 in the edges of the opening. The panel is inserted into position or removed therefrom through an opening in the top 32 of the frame.

The back part 3 of the guard consists of a unitary hollow casting the front of which is tapered as at 35 to fit snugly between the spaced rear edges of the front part and is provided with top and bottom extensions 36 and 37 which coact with the front part in closing the top and bottom ends of the water glass chamber. The interior of the back part is divided by a horizontal wall 40 located adjacent the lower end of the casting into the lamp chamber 21 previously mentioned and a relief passage 41, the latter communicating with the lower end of the water glass chamber and being extended laterally and downwardly in the form of a spout 43.

The discharge of steam and broken glass from this spout is conveyed to a point within close proximity of the firing deck 45 of the locomotive cab by a pipe 46. The latter is fastened to the backhead by pipe clips 47 screwed into fastening blocks 48 welded to the boiler backhead, displacement of the pipe from the clips being prevented by bolts 49.

The pipe is coupled to the spout by a knurled coupling sleeve 50 overlapping the abutting ends of the pipe and spout, a collar 51 welded to the pipe and abutting the lower edge of the sleeve, and a set screw 52 carried by the sleeve and extending into a slot 53 in the spout.

The upper end of the lamp chamber is closed by a cap 54 having a stud 55 adapted to enter a bayonet slot 56 in the wall of the chamber for the purpose of detachably securing the cap in place, accidental displacement of the stud from the slot being prevented by an external spring clip 56$^a$. The cap carries a lamp socket 57 for the lamp 22 and is bored and threaded as at 58 to receive a tubular loom 59 for the electric wires leading to the socket.

Figure 2:
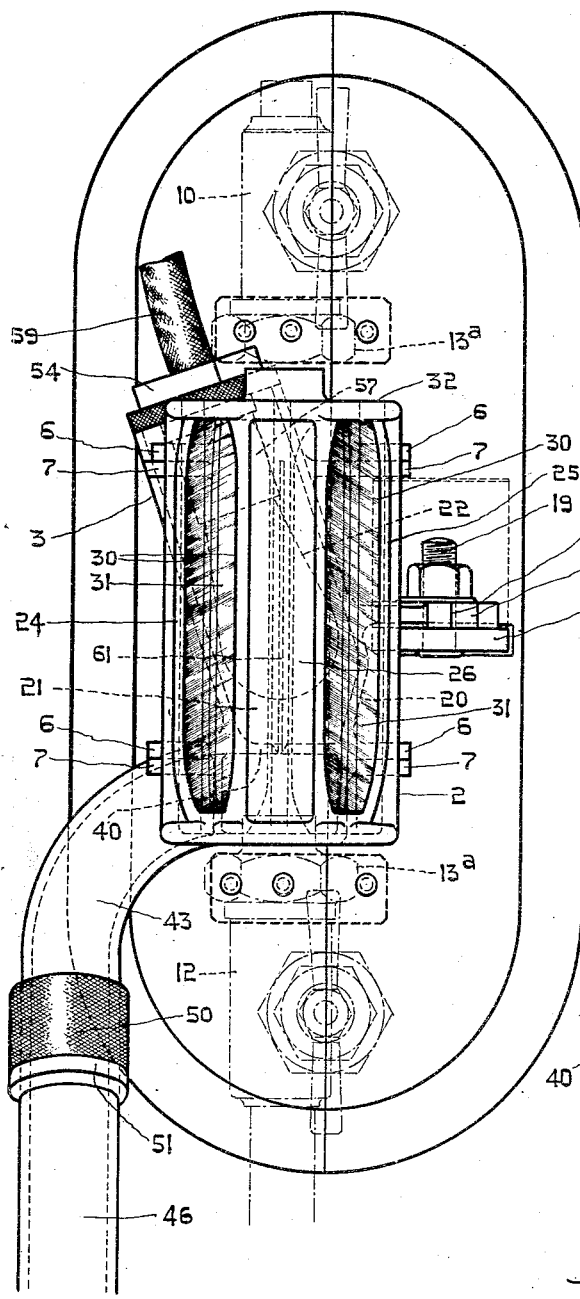
Figure 2 is a similar view drawn to a larger scale.
Figure 6:
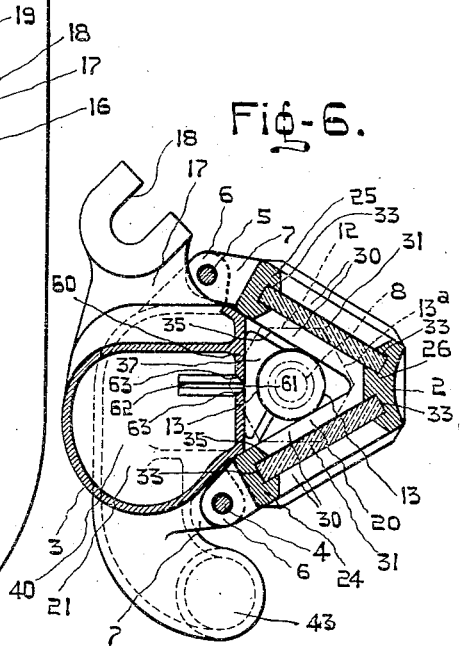
Figure 6 is a horizontal sectional view taken on line 6—6 Figure 3.

It will be noted that the lamp chamber is arranged obliquely relatively to the gauge glass projector. The purpose of this oblique arrangement of the lamp chamber is to remove the upper end of it from the immediate vicinity of the valve fitting 10 (Figure 2) to more readily enable the insertion and removal of the cap and lamp as a unit thereby facilitating the maintenance of this fitting.

The front wall 60 of the back casting separates the lamp chamber from the water glass chamber and is slotted vertically as at 61, the lower edge of the slot extending into the bottom of the chamber as at 62, and having its inner edges beveled off as at 63. This slot is located directly in rear of the water glass and its purpose is to focus the light from the lamp chamber thereon so that the water level will be clearly visible.

What I claim is as follows:—

1. In a gauge glass guard and illuminator for locomotive boilers equipped with valve fittings connected to the upper and lower ends of the gauge glass, a casting adapted to be mounted behind the gauge glass and provided with a lamp containing chamber, said chamber being obliquely disposed with reference to the longitudinal axis of the gauge glass so that the upper end of the chamber is clear of the upper valve fitting, a frame having a pair of angularly related glass plates and means hingedly connecting the frame to said casting to provide a protecting enclosure for the gauge glass.

2. A gauge glass guard and illuminator comprising separable parts adapted to fit around the gauge glass to enclose the same, one part comprising a hollow casting having a horizontal wall near its lower end dividing the interior of the casting into an upper lamp receiving chamber and a lower relief chamber, the upper portion of the front wall of the casting being provided with a slot for the passage of light from the lamp chamber and the lower portion of said wall being formed to provide an inlet opening to the relief chamber, said relief chamber having an outlet, the remaining part of said guard and protector comprising a frame of triangular cross section presenting angularly related wall portions including transparent panels, means releasably hinging the divergent edges of said walls to said casting so that the open side of the frame is closed by the front wall of the casting to provide a gauge glass chamber in communication with the lamp chamber and the relief chamber, said casting and frame being provided with upper and lower extensions adapted to fit around the gauge glass to close the top and bottom portions of the gauge glass chamber.

3. A gauge glass guard and illuminator comprising a hollow casting provided near its lower end with a horizontal wall dividing the interior of the casting into an upper lamp receiving chamber and a lower relief chamber, the upper portion of the front wall of the casting being slotted for the passage of light from the lamp chamber and the lower portion of said wall being formed to provide an inlet opening to the relief chamber, a frame of triangular cross section including angularly related walls provided with transparent panels, and means for securing the divergent edges of said angularly related walls to the casting to provide a gauge glass receiving chamber between the frame and the casting, said securing means including upper and lower apertured lugs carried by each of said angularly related walls, complementary apertured lugs carried by the sides of the casting, and removable hinge pins passing through the apertures of said lugs.

In testimony whereof I have signed my name to this specification.

WM. A. NEWMAN.